3,629,171
WAX COMPOSITIONS CONTAINING AN ETHYLENE-VINYL ACETATE COPOLYMER, AND ORGANIC ACID AND A BUTYL RUBBER
Charles J. Kremer, Brookhaven, Pa., and Dominic Apikos, Laurel Springs, N.J., assignors to Atlantic Richfield Company, New York, N.Y.
No Drawing. Filed May 9, 1969, Ser. No. 823,522
Int. Cl. C08d 9/08; C08f 15/00
U.S. Cl. 260—23.7 B                 13 Claims

ABSTRACT OF THE DISCLOSURE

This invention relates to wax compositions containing a wax, an ethylene-vinyl acetate copolymer, an acid component and a solid butyl rubber. These compositions have highly improved resistance to stress cracking and can be utilized as hot melt coatings for items such as paperboard and corrugated board for use in the food packaging industry.

BACKGROUND OF INVENTION

In United States application Ser. No. 457,218, now abandoned, filed May 19, 1965 in the name of Charles J. Kremer there is disclosed improved wax compositions which contain wax, an ethylene/vinyl acetate copolymer (EVA) and an acid. These compositions have improved physical properties such as tensile strength, elongation, break energy, flex strength and seal strength. In United States application Serial No. 557,901 (now U.S. Pat. No. 3,417,040) filed June 16, 1966 in the name of Charles J. Kremer there is disclosed an improvement in this basic wax system which comprises utilizing as the acid a component which contains both a liquid and an acid. These compositions have properties which are even superior to the basic wax/acid system.

While these wax/acid compositions have many improved physical properties, no improvement was reported for their resistance to stress cracking. As used throughout the specification and claims "resistance to stress cracking" means the ability of a sample to resist cracking at points of surface stress in the material. This property is extremely important in case of molded and extruded containers and in coated board stock particularly when the stock is used by the packaging industry for folded cartons. In molded or extruded containers and in folded cartons the stress is pronounced above the edges and scores. Stress failure is accleerated by surface-active liquids such as soap solutions, fruit juices, oils and fish and poultry body fluids. In packaging applications which come in contact with these liquids during shipping, the stress cracking of the coated board permits them to penetrate into the board.

SUMMARY OF INVENTION

It has now been discovered that if a solid butyl rubber is utilized in the above described wax/EVA/acid systems, tremendous improvements are obtained in the stress cracking resistance of the composition.

Therefore, it is an object of this invention to provide wax compositions which have improved resistance to stress cracking.

In general the compositions of this invention comprise in parts by weight (A) 100 parts of a wax having a melting point of greater than 120° F.
(B) from 5 to 150 parts of an ethylene-vinyl acetate copolymer having a polymerized vinyl acetate content ranging from 5 to 35 weight percent and a melt index ranging from 0.1 to 1000
(C) from 1 to 30 parts of a solid butyl rubber having an average molecular weight ranging from 80,000 to 600,000
(D) a wax-compatible, non-corrosive carboxylic acid in an amount sufficient to impart to the composition a total acid number ranging from 5 to 200, said acid itself having an acid number in excess of 20.

The wax component utilized in the composition of this invention can be of mineral, vegetable, animal or synthetic origin or mixtures thereof. The waxes must have a melting point greater than 120° F. Exemplary mineral origin waxes are the petroleum waxes, ozocerite and montan wax, etc. The petroleum and ozocerite waxes are comprised essentially of paraffinic hydrocarbons, whereas the montan wax is comprised essentially of high molecular weight esters, with traces of alcohols and acids also present. Examples of vegetable origin waxes are carnauba, candelilla, Japan waxes and the like. Animal waxes suitable for use in the practice of this invention are beeswax, Chinese wax, insect wax and similar waxes. The main constituent of vegetable and animal origin waxes are high molecular weight esters and saturated hydrocarbons with smaller amounts of higher molecular weight alcohols and acids also being present. Exemplary synthetic waxes are those produced by the esterification with polyhydric alcohols, the hydrogenation of vegetable oils and those made by the Fischer-Tropsch Synthesis.

As noted above, certain waxes are composed of mixtures of chemical compounds which include minor amounts of acids. Generally, however, these waxes do not have an acid number in excess of 20. It is therefore necessary that the acid component be added in order to impart the minimum required acid number to the composition.

The use of petroleum waxes represents a preferred embodiment of this invention. These waxes include paraffin waxes which have a melting point from 115° F. to 200° F. and the microcrystalline waxes have a melting point from 140° F. to 210° F. These waxes may be fully refined and thus contain very small amounts of hydrocarbon oils or they may be semi-refined (slack waxes) and have hydrocarbon oil contents of up to about 30 percent.

The most preferred compositions of this invention utilize a wax component containing either 100 percent by weight microcrystalline wax or from 20 to 80 percent by weight of a paraffin wax having a melting point ranging from 120° F. to 180° F. and from 80 to 20 percent of microcrystalline wax having a melting point ranging from 140° F. to 200° F. These wax components provide compositions which may be utilized in high temperature applications. Increasing the concentration of microcrystalline wax will impart a higher maximum use temperature and improve the ultimate physical strength while decreasing dimensional stability. With respect to paraffin waxes as a class the use of a non-normal paraffin wax imparts higher physical strength than the normal base paraffin waxes.

The use of an ethylene-vinyl acetate copolymer (EVA) is critical to the practice of this invention. This EVA copolymer should have a polymerized vinyl acetate content ranging from 5 weight percent to about 35 weight percent and a melt index ranging from 0.1 to about 1000 (ASTM D1238–62). The preferred EVA copolymers are those having a polymerized vinyl acetate content ranging from 15 weight percent to 35 weight percent and a melt index ranging from about .1 to about 150. The most preferred EVA copolymers contain from 26–29 percent polymerized vinyl acetate and have melt indices ranging from 0.1 to 25.

The concentration of EVA copolymer should be the minimum amount necessary to impart the desired physical properties to the composition. Concentrations ranging from about 5 to about 150 parts by weight per 100 parts of wax are operable. Preferably, the concentration of copolymer ranges from about 5 to about 100 parts per 100 parts of wax. Most preferably it ranges from 10 to 35 parts per 100 parts wax.

The third component which is critical to the practice of this invention is a solid butyl rubber. The butyl rubbers are prepared by the polymerization of isobutylene in the presence of small amounts of diene monomers such as isoprene. The resulting polymer consists essentially of isobutylene and contains from about 1 to about 10 weight percent of the diene monomer. These polymers have average molecular weights ranging from about 80,000 to about 600,000 and must preferably range from about 200,000 to about 500,000. The butyl rubbers are incorporated into the wax composition in amounts ranging from about 1 to about 15 weight percent. Based on 100 parts wax this loading corresponds from 1 to about 30 parts by weight rubber. Most preferably, the butyl rubber is present in an amount ranging from about 2 to about 15 parts by weight per 100 parts by weight wax. The use of butyl rubber usually permits a reduction in the loading of the EVA copolymer since both tend to impart strength properties to the blend. The EVA copolymer does not impart much stress cracking resistance and therefore the butyl rubber must be relied upon to improve this property. Conversely, the butyl rubber does not impart as much tensile strength to the compositions as the EVA copolymer. Both polymers impart an increase in the melt viscosity of the blend. Therefore, their combined loadings should be at the minimum necessary to obtain the properties desired.

The fourth ingredient which is critical to the practice of this invention is the acid component. In general, any carboxylic acid which is wax-compatible, non-corrosive and has an acid number in excess of 20 can be utilized in the compositions of this invention. It should be understood that a mixture of carboxylic acids can also be used in the compositions of the present invention. The carboxylic acid must not be corrosive to the extent that it will attack the metal parts of equipment or containers. In general, the lower molecular weight carboxylic acids such as, for example, formic, acetic, propionic, benzoic acids and the like are very corrosive and in addition are generally incompatible with wax.

The carboxylic acid preferably should have an acid number in excess of about 30 although acids with a lower acid number, i.e., about 20, can be used. Materials with a lower acid number, i.e., those of higher molecular weight are not desirable because they increase the viscosity of the molten composition without imparting corresponding or comparable increases in the desired properties. Acid number is used herein as it is normally understood by those skilled in the art, i.e., it is the number of milligrams of alcoholic potassium hydroxide required to neutralize 1 gram of the substance being tested in the presence of methyl orange. Any aliphatic, alicyclic, or aromatic acid having one or more carboxyl groups may be used in the compositions of this invention provided, however, that such acids are wax-compatible, non-corrosive and have an acid number in excess of about 20. The aliphatic carboxylic acids can be saturated or unsaturated. Exemplary saturated aliphatic carboxylic acids are nonanoic acid, lauric acid, tetradecanoic acid, pentacosanoic acid, natural occurring acids such as for example coconut fatty acid and tallow fatty acid, sebacic acid, 2-butyl-2-ethyl glutaric acid, and 2-propyl-1,2,4-pentane tricarboxylic acid. Exemplary unsaturated aliphatic carboxylic acids are oleic acid, linoleic acid, linolenic acid, and 5-octene-3,3,6-tricarboxylic acid. The alicyclic carboxylic acid may be saturated or unsaturated. Exemplary saturated alicyclic carboxylic acids are the naphthenic acids (cycloparaffinic acids), including those which have one or more alkyl side chains of varying length such as cyclohexane pelargonic acid. Exemplary unsaturated alicyclic carboxylic acids are abietic acid and acids obtained by dimerizing or trimerizing higher molecular weght unsaturated fatty acids such as oleic or linoleic acid. Aromatic acids such as naphthoic, anthroic, alkyl substituted phthalic acid, and alkyl substituted naphthalic acid may also be used in the practice of this invention.

Carboxylic acids that contain functional groups other than the carboxylic groups such as aldehyde, keto or hydroxyl groups can also be used in the compositions of this invention provided, however, that the functional group does not hinder the carboxyl moiety. Consequently, acids such as 12-hydroxy-stearic acid and oxidized petroleum waxes having an acid number in excess of about 20 can be also utilized in the compositions of this invention. Acids containing small proportions of other elements such as nitrogen, sulfur, oxygen, phosphorous etc. can also be utilized provided the additional elements do not hinder the carboxyl moiety. Examples of various acids which can be utilized are set forth in U.S. application Ser. No. 457,218 previously referred to and U.S. Pat. No. 3,417,040 which are hereby incorporated by reference into this specification.

A preferred carboxylic acid is abietic acid, a source of which is wood rosin which contains more or less abietic acid depending on how it is chemically modified. Thus the products of wood rosin which have been subjected to such chemical treatments as isomerization, air oxidation, hydrogenation, disproportionation, or dimerization are also suitable as the carboxylic acid component. By subjecting the wood rosin to any of the above treatments, the relative amounts of the acids which comprise the wood rosin are changed and consequently, the properties of the wood rosin may be varied to obtain the particularly desired properties. For instance, by oxidizing the wood rosin, it is possible to obtain a product with an increase softening point. Hydrogenation of the wood rosin results in a product with improved color stability. By submitting the wood rosin to disproportionation, a product with improved oxidation resistance is obtained. Dimerization of the wood rosin yields a product of higher softening point. The methods of modifying wood rosin by any one of the above chemical operations are well-known to those skilled in the art and the products obtained therefrom are available commercially.

As set forth in U.S. Pat. No. 3,417,040 superior properties results from the use of an acid component which contains both an acid and a liquid. This can be accomplished by either using a liquid acid or by using a solid acid (such as rosin) in combination with a liquid acid or non-acid. This combination should contain at least 35 weight percent of the organic acid having an acid number greater than 20. Secondly, it should contain at least 5 weight percent of an organic liquid. Both the organic acid and the organic liquid should have a boiling point greater than 300° F. at 7 mm. of mercury and both should be compatible with the wax, ethylene-vinyl acetate copolymer and butyl rubber at the temperature at which the hot melt coating is being applied. Most preferably, the organic acid has an acid number in excess of 30 and is present in the acid component in an amount in excess of 50 weight percent. Preferably, the organic liquid is present in the acid component in an amount in excess of 20 weight percent.

While the preferred acid component must contain both an acid and a liquid, both of these requirements can be satisfied by utilizing an organic carboxylic acid which is also a liquid at 70° F. On the other hand, both liquid organic acids and liquid organic non-acids can be used in the same composition if desired. For example, liquid acids such as the oligomers of fatty acids can be utilized alone or with a solid organic acid or a liquid organic non-acid. If a liquid organic carboxylic acid is used, it must have a melting point below 70° F., have a viscosity at 100° F. ranging from 500–10,000 SSU, have a molecular weight ranging from 400–2500 and have an acid number in excess of 20. Preferably, the acid has a viscosity at 100° F. ranging from 500–2,000 SSU and an average molecular weight ranging from 400–800. Preferred liquid acids are the dimerized and trimerized fatty acids containing from 16–22 carbon atoms; for example, dimerized or trimerized oleic, arachidonic, sorbic or eicosenic acids. Most preferred are the dimerized, and trimerized eighteen carbon fatty acids, such as dimerized or trimerized oleic or linolenic acids.

Organic carboxylic acids which are not liquids at 70° F. can be utilized if combined with at least 5 weight percent of an organic liquid. This solid organic carboxylic acid must have an average molecular weight ranging from 150 to 1,500 and an acid number in excess of 20. Preferably, this acid has an average molecular weight ranging from 400–800 and has a melting point ranging from 120°–200° F. A preferred solid organic carboxylic acid is abietic acid which is commonly found in wood rosins.

The organic liquids which can be utilized in the practice of this invention must be liquids at 70° F. and have a boiling point greater than 300° F. at 7 millimeters of mercury. As previously stated, the acid component must contain at least 5 percent of a liquid organic acid or a liquid organic non-acid. If a liquid organic non-acid is utilized it must be a hydrocarbon compound selected from the group consisting of oils or a styrene, butene or propene polymer.

The oil which can be utilized as an organic liquid can be any hydrocarbon oil having a viscosity at 100° F. ranging from 300–3,000 SSU. Preferably, the oil has a viscosity at 100° F. ranging from 500–1,500 SSU. The most preferred oil is a refined white oil.

The styrene polymers which can be utilized as the organic liquid in this invention must have a viscosity at 100° F. ranging from 800–100,000 SSU and an average molecular weight ranging from 300–3,000. Preferably, the viscosity at 100° F. ranges from 800 to 3,500 SSU and the average molecular weight ranges from 300–1,500. These polymers can be prepared by polymerizing various styrene monomers to produce low molecular weight polymers. A mixture of styrene monomers can also be polymerized. For example, suitable polymers can be derived from styrene, alpha-methyl styrene or alkylated styrenes such as alkylated alpha-methyl styrene, alkylated alpha-methyl para-methyl styrene, or alkylated para-methyl styrene or mixtures thereof. A particularly suitable polymer of this type is produced by the simultaneous alkylation and polymerization of monomeric styrene, alpha-methyl styrene, alpha-methylparamethyl styrene, para-methyl styrene or a mixture of these monomers.

The liquid butene polymers which can be utilized as the organic liquids in this invention must contain at least 90 percent by weight butene and have a viscosity at 100° F. ranging from 1,000 to 1,000,000 SSU and an average molecular weight ranging from 300–12,000. These liquid polymers should not be confused with the solid butyl rubbers heretofore referred to in the specification. Copolymers containing butene and up to 10 percent of another lower mono-olefin can also be utilized. Preferably the butene polymer is a homopolymer which has a viscosity at 100° F. ranging from 10,000 to 200,000 and an average molecular weight ranging from 800–3,000. Most preferably the average molecular weight ranges from 1,600 to 2,500. The most preferred butene polymer is one prepared by the polymerization of butene-1 or isobutylene.

The propene polymer which can be utilized as an organic liquid in this invention has a viscosity at 100° F. ranging from 10,000–1,000,000 SSU and an average molecular weight ranging from 800–3,500. Preferably, this polymer has a viscosity at 100° F. ranging from 20,000 to 50,000 SSU and an average molecular weight ranging from 1,000 to 2,000.

Preferred compositions can be prepared by utilizing as the acid component a mixture of rosin acid and dimerized fatty acids or a mixture of rosin acid and styrene polymer. For example, the acid component can contain from 70 to 95 percent by weight rosin acid and from 5 to 30 percent by weight of a dimer of 9,12-octadecadienoic acid or a styrene homopolymer.

The acid component is incorporated into the composition of this invention in an amount sufficient to impart thereto an acid number ranging from 5–200. Most preferably, it is present in an amount sufficient to impart an acid number ranging from 10–75. The concentration of acid component necessary to impart the required acid number will, of course, depend on the particular acid utilized, but generally it ranges from 10 to 150 parts by weight per 100 parts wax.

Ingredients commonly added to wax or ethylene-vinyl acetate copolymers can be incorporated into the compositions of this invention in functional amounts without departing from the scope thereof. Examples of these ingredients include but are not limited to: heat and ultraviolet light stabilizers, inert fillers, secondary plasticizers, anti-blocking agents, pigments and colorants, anti-oxidants, gloss stabilizers, viscosity-index improvers, solvents, anti-scuff agents, etc. Specifically, ingredients such as the solid glycol esters of rosin acids can be added to improve color, odor and heat stability.

The preparation of the compositions of this invention is not critical to the practice of it. For example, these compositions can be prepared by heating the wax to a temperature above its melting point, adding the ethylene-vinyl acetate copolymer, acid component, butyl rubber and other additives and agitating vigorously until a homogeneous hot melt is obtained. It has been found, however, that the acid component facilitates the dispersion of the polymers. Therefore, if this method is used it is preferable to incorporate the acid component into the melted wax prior to the addition of the polymers. A specific method for preparation is as follows: the waxes are melted together, any anti-oxidants or heat stabilizers are added and the melt is then brought to a temperature about 275° F. The acid component is heated to about 275° F. and added to the hot melt. The ethylene-vinyl acetate copolymer and butyl rubber are then added to the melt accompanied by vigorous stirring while maintaining the melt temperature above about 275° F. After all of the copolymer has been added to melt temperature is raised to about 310° F. and agitated until the composition is homogeneous. As described in U.S. 3,417,040 the masterbatch system can be used. In this method the polymers are first mixed with the acid component by combining them at a temperature in excess of 250° F. When this blend is homogeneous it is added to the molten wax.

The following examples are given to illustrate specific embodiments of this invention and should not be construed as limitations to the scope of the invention. All parts and percents are by weight.

EXAMPLE I

The blends of Table I were prepared as follows. The rosin acid and dimerized fatty acid were heated to 275°

F. The polymers were then added to the acids and agitated until uniformly dispersed. The wax was melted and heated to 200° F. and then added to the hot acid/polymer mix.

TABLE I

| Formulation No. | 1 | 2 | 3 | 4 | 5 | 6 |
|---|---|---|---|---|---|---|
| Parts by weight: | | | | | | |
| Paraffin wax [1] | 66.7 | 66.7 | 66.7 | 66.7 | 66.7 | 66.7 |
| Microcrystalline wax [2] | 33.3 | 33.3 | 33.3 | 33.3 | 33.3 | 33.3 |
| EVA copolymer [3] | 20.0 | 16.7 | 14.2 | 11.7 | 9.2 | 11.3 |
| Butyl rubber [4] | | 3.3 | 5.8 | 8.3 | 10.8 | 2.3 |
| Rosin acid [5] | 38.3 | 36.7 | 36.7 | 38.3 | 38.3 | |
| Dimerized acid [6] | 8.3 | 10.0 | 10.0 | 8.3 | 8.3 | |
| Properties: | | | | | | |
| Melt viscosity at 250° F., cp | 358 | 450 | 330 | 550 | 570 | 41 |
| Acid number at 250° F., cp | 45 | 45 | 45 | 45 | 45 | 45 |
| Strength properties: [7] | | | | | | |
| Tensile at yield, p.s.i. | 490 | 492 | 360 | 255 | 170 | 312 |
| Tensile at break, p.s.i. | 330 | 325 | 211 | 113 | 90 | 57 |
| Elongation, percent | 30.3 | 32.0 | 40.0 | 41.0 | 32.0 | 1.3 |
| Break energy ft.-lb./in.[3] | 10.6 | 10.1 | 10.0 | 8.7 | 8.3 | 0.4 |
| Penetration [8] at 110° F. | 19 | 25 | 30 | 34 | 37 | 16 |
| Environmental stress cracking,[9] minutes | 3 | 5.5 | 14 | 45 | 98 | 0 |

[1] Refined paraffin wax, melting point 150° F. (ASTM D-87).
[2] Microcrystalline wax, melting point 175° F. (ASTM D-127).
[3] An ethylene-vinyl acetate copolymer having a bound vinyl acetate content of 28 weight percent and a melt index of 3.0.
[4] Enjay butyl rubber #268.—An isobutylene rubber having an average molecular weight of 450,000, a Mooney viscosity (ML 1+3 min.) at 260° F. of about 55.
[5] A high degree of disproportionation wood rosin with a melting point of 181° F. (ring and ball) acid number of 154, saponification of 189 and an average molecular weight of 450.
[6] A dimerized 9,12-octadecadienoic acid having a melting point of 35° F., an acid number of 190 and a viscosity at 100° F. of 1,000 SSU.
[7] ASTM D-1708-59T.—Instron microtensile at 0.5 inch/minute.
[8] ASTM D-1321.
[9] The stress cracking test utilized is a modification of ASTM D-1693-60T. The procedure is as follows: Four test strips ½″ x 2½″ were cut from two cast slabs of 92 mils in thickness. The four test strips are then aged at 73° F.±2° F. and 50 percent±5 percent relative humidity for 24 hours. A detergent solution was then prepared containing 4½ gallons of distilled water, 5 ounces of dioctyl sodium sulfosuccinate (Aerosol OT-75 percent active) and 25 grams of acid black concentrated dye. After aging, the two ends of the test strip are brought together to form a loop and clamped in that position with a pinchcock. The loop with the clamp is immediately immersed in the detergent solution. A second strip is also immediately prepared and placed in the solution. The two samples are then inspected initially at 30 second intervals and one minute intervals thereafter for the appearance of stress cracks which appear on the outermost edge of the loop. The time which is recorded in minutes is that when the first sign of hairline cracks show in the sample. After the first pair of samples fail, the procedure is repeated with the second pair of strips. The results of the four test strips are then averaged and reported as the stress cracking value.

Formulations Nos. 2–5 demonstrate the improved stress cracking resistance which is obtained by the compositions of this invention. Formulations Nos. 2–5 have, respectively, 83%, 365%, 1400% and 3170% greater stress cracking resistance than the control (Formulation #1). Formulation No. 6 demonstrates that when the acid is removed from the system the composition does not have any stress cracking resistance.

EXAMPLE II

The formulations in Table II were prepared in the same manner as described in Example I.

TABLE II

| Formulation No. | 7 | 8 | 9 | 10 | 11 |
|---|---|---|---|---|---|
| Parts by weight: | | | | | |
| Paraffin wax [1] | 66.7 | 66.7 | 66.7 | 66.7 | 66.7 |
| Microcrystalline wax [2] | 33.3 | 33.3 | 33.3 | 33.3 | 33.3 |
| EVA copolymer [3] | 20.0 | 15.0 | 6.7 | 12.5 | 8.3 |
| Butyl rubber [10] | | 5.0 | 13.3 | | |
| Butyl rubber [11] | | | | 7.5 | 11.7 |
| Rosin acid [5] | 38.3 | 36.7 | 38.3 | 38.3 | 33.3 |
| Dimerized acid [6] | 8.3 | 10.0 | 8.3 | 8.3 | 13. |
| Properties: | | | | | |
| Melt viscosity at 250° F., cp | 358 | 470 | 501 | 440 | 520 |
| Acid number | 45 | 45 | 45 | 45 | 46 |
| Strength properties: [7] | | | | | |
| Tensile at yield, p.s.i. | 490 | 500 | 172 | 520 | 161 |
| Tensile at break, p.s.i. | 330 | 330 | 58 | 201 | 97 |
| Elongation, percent | 30.3 | 35.0 | 22.0 | 40.0 | 28.0 |
| Break energy, ft.-lb./in.[3] | 10.6 | 12.1 | 4.1 | 9.7 | 5.8 |
| Penetration [8] at 110° F. | 19 | 29 | 41 | 33 | 47 |
| Environmental stress cracking,[9] minutes | 3 | 6.5 | 61 | 42 | 78 |

Footnotes 1 through 9 as defined in Table I.
[10] Enjay butyl rubber #077.—An isobutylene rubber having an average molecular weight of 350,000 and a Mooney viscosity (ML 1+8 min.) at 212° F. of about 65.
[11] Enjay butyl rubber #065.—An isobutylene rubber having an average molecular weight of 350,000 and a Mooney viscosity (ML 1+8 min.) at 212° F. of about 45.

Formulations Nos. 8–11 demonstrate the stress cracking resistance which can be obtained with various types of butyl rubber. These formulations had respectively 116%, 1935%, 1300% and 2500% better stress cracking resistance than Formulation No. 7—the control.

The compositions of this invention can be utilized in numerous wax coating applications such as in food carton packaging especially for wet-pack shipping of perishable foods such as poultry, fish, beef and various fruits.

We claim:
1. A composition comprising in parts by weight:
(A) 100 parts of a wax having a melting point greater than 120° F.
(B) from 5 to 150 parts of an ethylene-vinyl acetate copolymer having a polymerized vinyl acetate content ranging from 5 to 35 weight percent and a melt index ranging from 0.1 to 1000.
(C) from 1 to 30 parts of a solid butyl rubber having an average molecular weight ranging from 80,000 to 600,000.
(D) in an amount sufficient to impart to the composition a total acid number ranging from 5 to 200, a wax compatible non-corrosive carboxylic acid, said acid having an acid number in excess of about 20.

2. A composition according to claim 1 wherein the ethylene-vinyl acetate copolymer contains from 15 to 35 weight percent polymerized vinyl acetate.

3. A composition according to claim 1 wherein the ethylene-vinyl acetate copolymer has a melt index ranging from 0.1 to 25.

4. A composition according to claim 1 wherein the concentration of ethylene-vinyl acetate copolymer ranges from about 10 to about 35 parts per 100 parts of wax.

5. A composition according to claim 1 wherein the concentration of solid butyl rubber ranges from 2 to 15 parts per 100 parts by weight wax.

6. A composition according to claim 1 wherein the solid butyl rubber has a molecular weight ranging from 200,000 to 500,000.

7. A composition according to claim 1 wherein the wax is a petroleum wax.

8. A composition according to claim 1 wherein the acid is a rosin acid.

9. A composition according to claim 1 wherein the acid component has both liquid and acid properties, said component containing at least 35 percent by weight acid and at least 5 percent by weight liquid, all having boiling points greater than 300° F. at 7 millimeters of mercury, said acid being selected from the group consisting of:
(A) an organic carboxylic acid which is a liquid at 70° F., has a viscosity at 100° F. ranging from 500 to 10,000 SSU, and average molecular weight ranging from 400 to 2500, and an acid number in excess of 20.
(B) an organic carboxylic acid which has a melting point above 70° F., an average molecular weight ranging from 150 to 1500, and an acid number in excess of 20 and,
(C) mixtures of (A) and (B),
said liquids being selected from the group consisting of:
(A) an organic carboxylic acid which is a liquid at 70° F., has a viscosity at 100° F. ranging from 500 to 10,000 SSU, and average molecular weight ranging from 400 to 2500, and an acid number in excess of 20.
(B) a hydrocarbon which is a liquid at 70° F. selected from the group consisting of:
(1) an oil having a viscosity at 100° F. ranging from 300 to 3,000 SSU
(2) a styrene polymer having a viscosity at 100° F. ranging from 800 to 100,000 SSU and an average molecular weight ranging from 300 to 3,000
(3) a butene polymer containing at least 90 percent by weight butene, having a viscosity at 100°

F. ranging from 1000 to 1,000,000 SSU and an average molecular weight ranging from 300 to 12,000

(4) a propene polymer having a viscosity at 100° F. ranging from 10,000 to 1,000,000 SSU and an average molecular weight ranging from 800 to 3,500

(C) mixtures of (A) and (B).

10. A composition according to claim 1 wherein the acid component of (D) is a mixture containing a liquid acid and rosin acid.

11. A composition according to claim 1 wherein the acid component of (D) is present in an amount sufficient to impart to the composition an acid number ranging from 10 to 75.

12. A composition according to claim 1 wherein:
(A) the wax component is a blend of paraffin wax and microcrystalline waxes
(B) the ethylene-vinyl acetate copolymer has a polymerized vinyl acetate content ranging from 20 to 35 percent by weight, a melt index ranging from 0.1 to 25 and is present in an amount ranging from 10 to 35 parts (C) the acid component is present in an amount sufficient to impart to the composition an acid number ranging from 10–75 and is a mixture comprising
(1) from 70 to 95 percent by weight of rosin acids
(2) from 5 to 30 percent by weight of a dimer of 9,12-octadecadienoic acid.

13. An article of manufacture coated on at least one side thereof with the composition of claim 1.

References Cited

UNITED STATES PATENTS

| | | | |
|---|---|---|---|
| 3,262,996 | 7/1966 | Kurtz et al. | 260—887 |
| 3,396,134 | 8/1968 | Cox | 260—28.5 |
| 3,417,040 | 12/1968 | Kremer | 260—27 |

DONALD E. CZAJA, Primary Examiner

R. W. GRIFFIN, Assistant Examiner

U.S. Cl. X.R.

117—155 UA, 158, 161 A; 161—235, 251; 260—28.5 AV, 28.5 B, 33.6 AQ, 33.6 UA